 US009196256B2

(12) United States Patent
Su et al.

(10) Patent No.: US 9,196,256 B2
(45) Date of Patent: Nov. 24, 2015

(54) DATA PROCESSING METHOD THAT SELECTIVELY PERFORMS ERROR CORRECTION OPERATION IN RESPONSE TO DETERMINATION BASED ON CHARACTERISTIC OF PACKETS CORRESPONDING TO SAME SET OF SPEECH DATA, AND ASSOCIATED DATA PROCESSING APPARATUS

(71) Applicant: MEDIATEK INC., Hsin-Chu (TW)

(72) Inventors: Wei-Kun Su, Taipei (TW); Hsuan-Yi Hou, New Taipei (TW); Wei-Chu Lai, Yilan County (TW); Chia-Wei Tao, Tainan (TW); Cheng-Lun Hu, Taipei (TW); Chieh-Cheng Cheng, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 208 days.

(21) Appl. No.: 13/962,943

(22) Filed: Aug. 8, 2013

(65) Prior Publication Data

US 2014/0222420 A1 Aug. 7, 2014

Related U.S. Application Data

(60) Provisional application No. 61/761,923, filed on Feb. 7, 2013.

(51) Int. Cl.
*G10L 19/00* (2013.01)
*G10L 21/00* (2013.01)
*G10L 21/02* (2013.01)
*G10L 19/005* (2013.01)
*H04L 1/18* (2006.01)
*H04L 1/00* (2006.01)

(52) U.S. Cl.
CPC ............ *G10L 19/005* (2013.01); *H04L 1/1838* (2013.01); *H04L 1/0061* (2013.01)

(58) Field of Classification Search
USPC .................................. 704/200–232, 500–504
See application file for complete search history.

(56) References Cited

U.S. PATENT DOCUMENTS

| 8,392,810 | B2 | 3/2013 | Linsky | |
|---|---|---|---|---|
| 2003/0163304 | A1* | 8/2003 | Mekuria et al. | 704/207 |
| 2005/0043959 | A1* | 2/2005 | Stemerdink et al. | 704/500 |
| 2009/0006084 | A1* | 1/2009 | Chen | 704/211 |
| 2010/0251051 | A1* | 9/2010 | Sun et al. | 714/747 |
| 2010/0324911 | A1* | 12/2010 | Jougit et al. | 704/500 |
| 2011/0099008 | A1* | 4/2011 | Zopf | 704/219 |
| 2011/0196673 | A1* | 8/2011 | Sharma et al. | 704/207 |

* cited by examiner

*Primary Examiner* — Jesse Pullias
(74) *Attorney, Agent, or Firm* — Winston Hsu; Scott Margo

(57) ABSTRACT

A data processing method for performing data processing on wireless received data and an associated data processing apparatus are provided, where the data processing method is applied to an electronic device. The data processing method includes the steps of: wirelessly receiving a plurality of packets corresponding to a same set of speech data from another electronic device; and selectively performing error correction operation on at least one of the plurality of packets to obtain the set of speech data, wherein whether to perform the error correction operation is determined according to at least one characteristic of the plurality of packets. More particularly, the error correction operation is selectively performed for at least one scenario of a timing critical scenario and a re-transmission limited scenario.

15 Claims, 5 Drawing Sheets

DATA PROCESSING METHOD THAT SELECTIVELY PERFORMS ERROR CORRECTION OPERATION IN RESPONSE TO DETERMINATION BASED ON CHARACTERISTIC OF PACKETS CORRESPONDING TO SAME SET OF SPEECH DATA, AND ASSOCIATED DATA PROCESSING APPARATUS

CROSS REFERENCE TO RELATED APPLICATIONS

This application claims the benefit of U.S. Provisional Application No. 61/761,923, which was filed on Feb. 7, 2013, and is included herein by reference.

BACKGROUND

The present invention relates to Bluetooth (BT) speech improvement, and more particularly, to a data processing method for performing data processing on wireless received data, and to an associated data processing apparatus.

A conventional portable electronic device such as a multi-functional mobile phone equipped with personal digital assistant (PDA) functionalities or a PDA equipped with mobile phone functionalities can be very helpful to the user. In a situation where the conventional portable electronic device is utilized for making a phone call and the user talks with somebody through a BT headset, rather than using the microphone or the speaker on the conventional portable electronic device, some problems may occur. For example, the BT speech quality may be very poor due to a long distance between the BT headset and the conventional portable electronic device, such as a distance of ten or more meters. In another example, the BT speech quality may be very poor due to cross-body interference.

According to the related art, some conventional methods are proposed, in order to solve these problems. However, further problems such as some side effects may be introduced. For example, the BT Special Interest Group (SIG) specification allows more re-transmission to increase the speech data delivery successful rate, where the more often BT re-transmission is used, the less time is available for Wireless-Fidelity (Wi-Fi) functions or other BT functions such as some Bluetooth Low Energy (BLE) functions. In another example, some of the conventional methods cannot guarantee the correctness of speech data, and therefore may waste the precious time of the user in a situation where the output voice is incorrect. Thus, a novel method is required for providing data processing control of an electronic device.

SUMMARY

It is therefore an objective of the claimed invention to provide a data processing method for performing data processing on wireless received data, and to provide an associated data processing apparatus, in order to solve the above-mentioned problems.

According to at least one preferred embodiment, a data processing method for performing data processing on wireless received data is provided, where the method is applied to an electronic device. The method includes the steps of: wirelessly receiving a plurality of packets corresponding to a same set of speech data from another electronic device; and selectively performing error correction operation on at least one of the plurality of packets to obtain the set of speech data, wherein whether to perform the error correction operation is determined according to at least one characteristic of the plurality of packets. More particularly, the error correction operation is selectively performed for at least one scenario of a timing critical scenario and a re-transmission limited scenario.

According to at least one preferred embodiment, a data processing apparatus applying to an electronic device is provided. The apparatus includes a wireless communication control circuit arranged to wirelessly receive a plurality of packets corresponding to a same set of speech data from another electronic device; and a processing circuit, coupled to the wireless communication control circuit, arranged to selectively perform error correction operation on at least one of the plurality of packets to obtain the set of speech data, wherein whether to perform the error correction operation of the set of speech data is determined according to at least one characteristic of the plurality of packets.

It is an advantage of the present invention that the present invention method and apparatus can perform selective error correction to reduce the probability of performing packet loss concealment (PLC). As a result, the speech quality can be improved. In addition, in comparison with the related art, the present invention method and apparatus can enhance the correctness of speech data, and therefore, the overall performance of the electronic device implemented with the present invention method and apparatus is greater than that of the conventional electronic device. Additionally, as the error correction can be selectively performed for at least one scenario of timing critical or re-transmission limited scenarios, the present invention method and apparatus can efficiently enhance the speech quality in a situation where the data processing time is limited.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
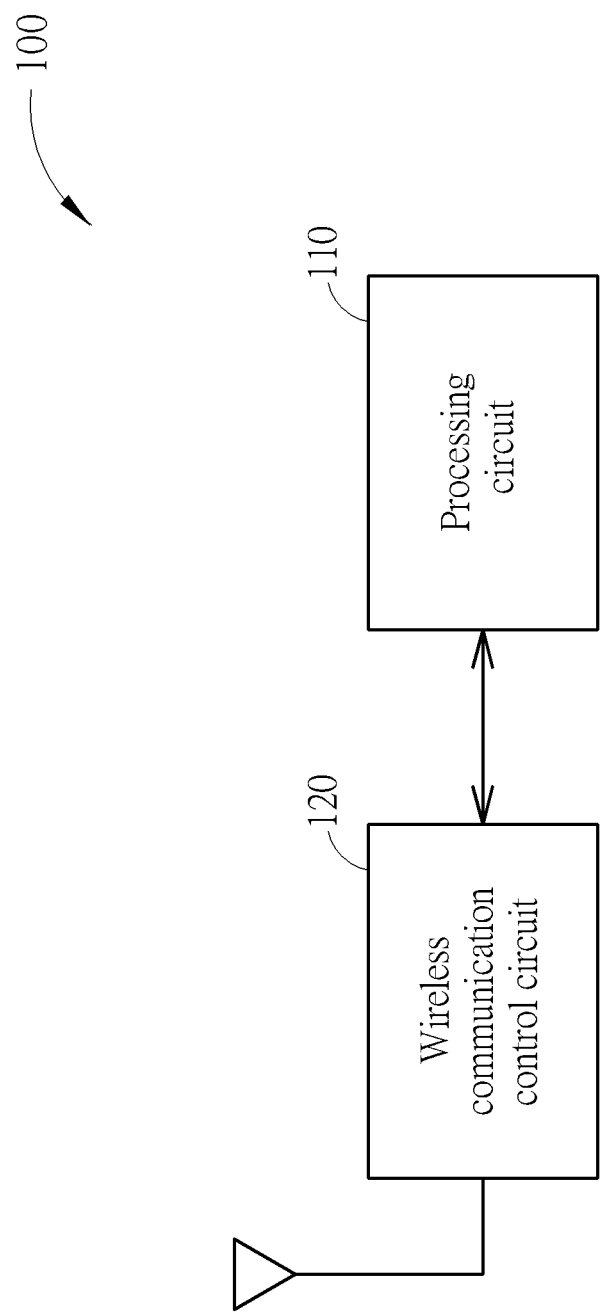
FIG. 1 is a diagram of an apparatus for performing data processing on wireless received data according to a first embodiment of the present invention.

FIG. 1 is a diagram of an apparatus 100 for performing data processing on wireless received data according to a first embodiment of the present invention, where the apparatus 100 can also be referred to as the data processing apparatus. The apparatus 100 may comprise at least one portion (e.g. a portion or all) of an electronic device, and examples of the electronic device may include, but not limited to, a mobile phone (e.g. a multifunctional mobile phone), a personal digital assistant (PDA) equipped with mobile phone functionalities, and a personal computer such as a laptop computer or desktop computer. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise an electronic system comprising the electronic device mentioned above, such as a system formed with a mobile phone complying with Bluetooth (BT) standards and a BT headset.

As shown in FIG. 1, the apparatus 100 may comprise a processing circuit 110 and a wireless communication control circuit 120, and the processing circuit 110 and the wireless communication control circuit 120 are coupled to each other. In addition, the apparatus 100 may further comprise at least one antenna (e.g. one or more antennas) coupled to the wireless communication control circuit 120, for transmitting or receiving wireless signals. For example, the wireless communication control circuit 120 can be equipped with at least one transceiver. In another example, the wireless communication control circuit 120 can be equipped with at least one transmitter and at least one receiver. According to this embodiment, the processing circuit 110 is capable of controlling operations of the electronic device, and the wireless communication control circuit 120 is capable of performing wireless communication operations under control of the processing circuit 110.

Figure 2:
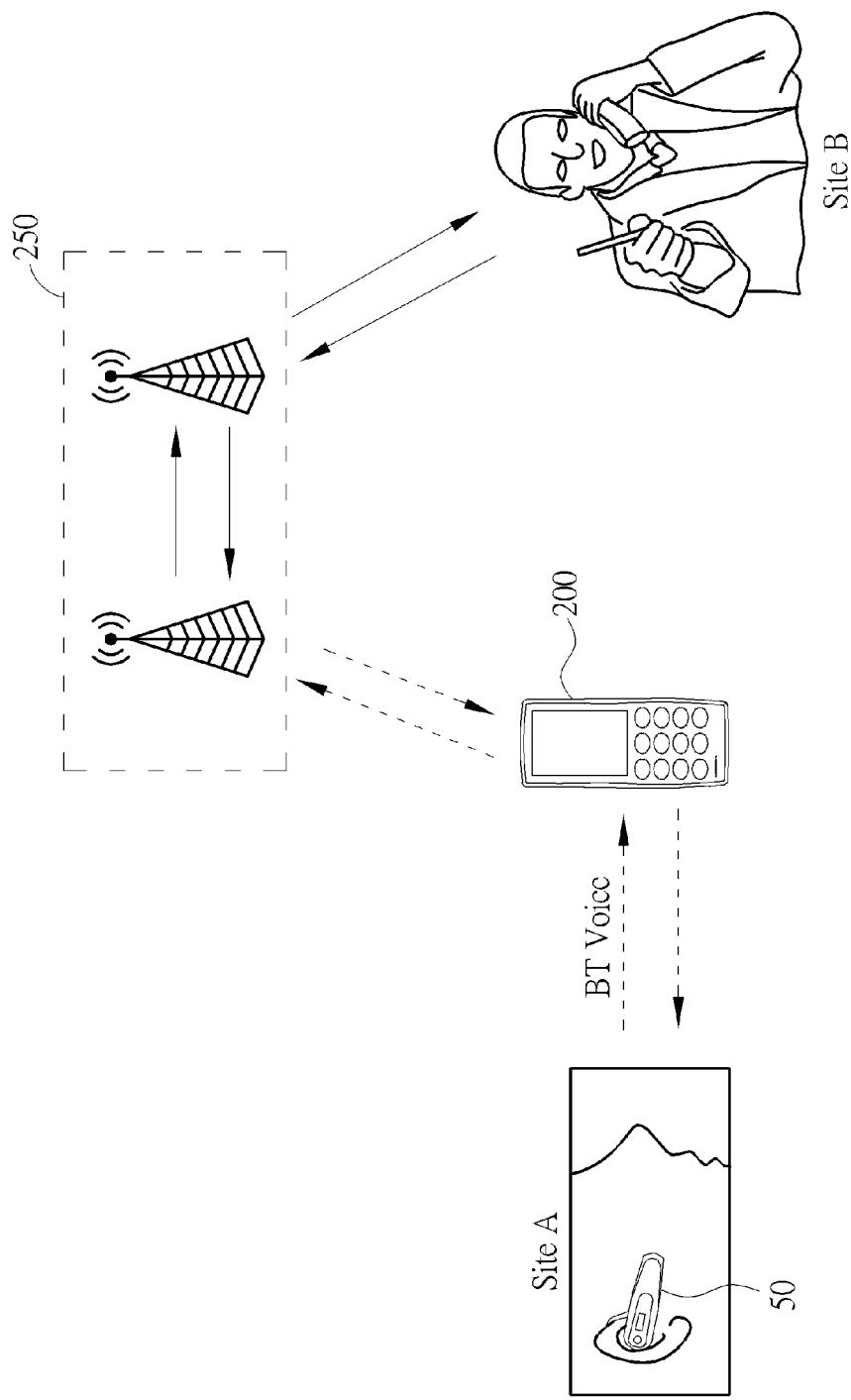
FIG. 2 illustrates a mobile phone and a Bluetooth (BT) headset associated to the mobile phone according to an embodiment of the present invention.

FIG. 2 illustrates a mobile phone 200 and a BT headset 50 (e.g. one earphone with a microphone) associated to the mobile phone 200 according to an embodiment of the present invention. As shown in FIG. 2, the user (labeled "Site A" in FIG. 2, for example) may utilize the BT headset 50 and the mobile phone 200 to talk with somebody (labeled "Site B" in FIG. 2, for example) through a network 250.

According to this embodiment, both of the mobile phone 200 and the BT headset 50 comply with BT standards, and the mobile phone 200 and the BT headset 50 may communicate with each other through at least one BT channel (e.g. one or more BT channels) such as that labeled "BT Voice" in FIG. 2, where the associated speech data (or voice data) can be transmitted through the aforementioned at least one BT channel. More particularly, as the BT Special Interest Group (SIG) specification allows re-transmission to increase the speech data delivery successful rate, each of the mobile phone 200 and the BT headset 50 is capable of performing re-transmission operations, and is capable of triggering re-transmission operations of the other. Regarding the implementation details of BT re-transmission, please refer to the BT SIG specification for more information.

Please note that any of the mobile phone 200 and the BT headset 50 can be taken as an example of the electronic device mentioned above. In a situation where the mobile phone 200 is taken as an example of the electronic device mentioned above, the processing circuit 110 may comprise at least one processor and associated hardware circuit within the mobile phone 200, and the wireless communication control circuit 120 may comprise a wireless communication control chipset within the mobile phone 200. This is for illustrative purposes only, and is not meant to be a limitation of the present invention. According to some variations of this embodiment, the processing circuit 110 and the wireless communication control circuit 120 can be integrated into the same circuit such as a control IC of the mobile phone 200.

In addition, in a situation where the BT headset 50 is taken as an example of the electronic device mentioned above, the processing circuit 110 and the wireless communication control circuit 120 can be integrated into the same circuit such as a control IC of the BT headset 50. According to this embodiment, the BT headset 50 may comprise a microphone and one earphone. This is for illustrative purposes only, and is not meant to be a limitation of the present invention. According to a variation of this embodiment, the BT headset 50 may comprise a microphone and a set of earphones. According to some other variations of this embodiment, the BT headset 50 may comprise a microphone and at least one headphone (e.g. one or more headphones).

Figure 3:
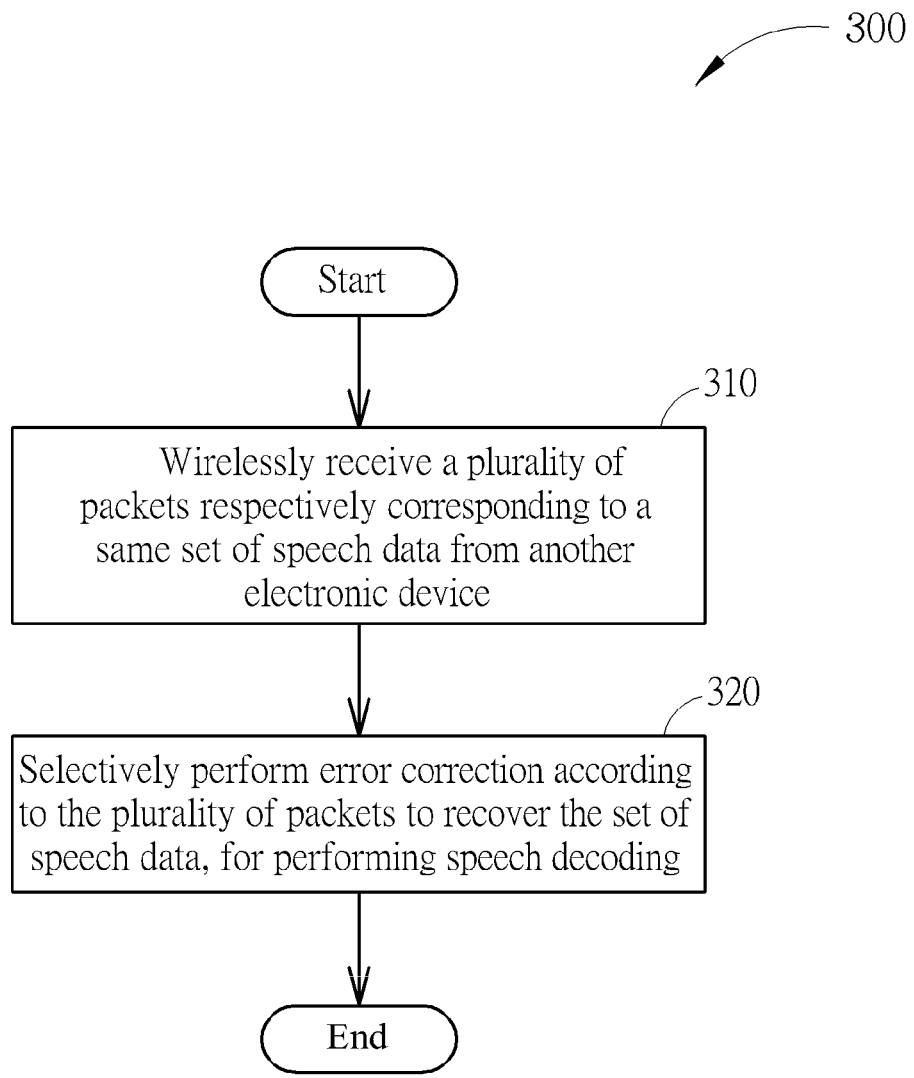
FIG. 3 illustrates a flowchart of a method for performing data processing on wireless received data according to an embodiment of the present invention.

FIG. 3 illustrates a flowchart of a method 300 for performing data processing on wireless received data according to an embodiment of the present invention, where the method 300 can also be referred to as the data processing method. The method 300 shown in FIG. 3 can be applied to the apparatus 100 shown in FIG. 1, and more particularly, can be applied to any of the mobile phone 200 and the BT headset 50 shown in FIG. 2. The method is described as follows.

In Step 310, the wireless communication control circuit 120 wirelessly receives a plurality of packets respectively corresponding to a same set of speech data from another electronic device, where the same set of speech data is transmitted from the other electronic device multiple times due to, for example, Header Error Check (HEC) or Cyclic Redundancy Check (CRC) errors. For example, in a situation where the mobile phone 200 is taken as an example of the electronic device mentioned above, the other electronic device may represent the BT headset 50. In another example, in a situation where the BT headset 50 is taken as an example of the electronic device mentioned above, the other electronic device may represent the mobile phone 200.

More particularly, the processing circuit 110 may check whether there is any HEC error or any CRC error in a specific packet of the plurality of packets. For example, when it is detected that there is a HEC error or a CRC error in the specific packet, the processing circuit 110 may notify the other electronic device to trigger re-transmission (e.g. the aforementioned BT re-transmission) of the set of speech data, in order to receive another packet of the plurality of packets. In another example, the processing circuit 110 may trigger a re-transmission operation of the set of speech data in order to receive another packet of the plurality of packets. As a result of the re-transmission operation(s) performed by the other electronic device, the wireless communication control circuit 120 may receive all of the plurality of packets respectively corresponding to the same set of speech data from the other electronic device.

In Step 320, the processing circuit 110 selectively performs error correction according to the plurality of packets to recover the set of speech data, for performing speech decoding. More particularly, the processing circuit 110 selectively performs an error correction operation on at least one of the plurality of packets to obtain the set of speech data, where whether to perform the error correction operation mentioned above is determined according to at least one characteristic of the plurality of packets. For example, the aforementioned at least one characteristic may comprise a number of erroneous packets within the plurality of packets. In another example, the aforementioned at least one characteristic may comprise a number of errors in at least one packet of the plurality of packets.

According to this embodiment, the error correction (more particularly, the error correction operation mentioned above) may comprise CRC error correction. For example, the processing circuit 110 may check if at least two packets (e.g. two or more packets) of the plurality of packets are CRC-incorrect, and when it is detected that at least two packets (e.g. two or more packets) of the plurality of packets are CRC-incorrect, the processing circuit 110 performs the CRC error correction operation on at least one of the packets to obtain the set of speech data. More particularly, the processing circuit 110 may modify at least one potential error bit of at least one of the two packets to obtain a trial packet, and check whether the trial packet is CRC-correct in order to obtain the set of speech data, and identify the potential error bit according to at least one difference between the two packets. If the trial packet is CRC-correct, the trial packet is utilized as the set of speech data for further speech decoding. This is for illustrative purposes only, and is not meant to be a limitation of the present invention. In another example, the processing circuit 110 may check whether each of the two packets contains at least one CRC error to determine whether the at least two packets are CRC-incorrect. In another example, the processing circuit 110 may check if at least two packets of the plurality of packets are HEC-incorrect or CRC-incorrect, and if no, the processing circuit 110 may perform a packet loss concealment (PLC) operation, rather than performing the CRC error correction. In some examples, the processing circuit 110 may perform speech decoding operation on the obtained speech data.

According to some embodiments of the present invention, such as some variations of the embodiment shown in FIG. 3, when it is detected that at least two packets (e.g. two or more packets) of the plurality of packets are CRC-incorrect, the processing circuit 110 performs the CRC error correction on at least one potential error bit location (e.g. one or more potential error bit locations) of the set of speech data to recover the set of speech data, for performing speech decoding. More particularly, when it is detected that the aforementioned at least two packets are CRC-incorrect, the processing circuit 110 may determine the aforementioned at least one potential error bit location of the set of speech data according to the plurality of packets. For example, the processing circuit 110 forcibly sets one of a plurality of candidate bits (e.g. a candidate bit "0", or a candidate bit "1") at the aforementioned at least one potential error bit location within one of the aforementioned at least two packets to obtain a trial packet and checks whether the trial packet is CRC-correct, in order to recover the set of speech data. In addition, the processing circuit 110 finds at least one location corresponding to at least one difference between the aforementioned at least two packets, and utilizes the aforementioned at least one location as the aforementioned at least one potential error bit location. When it is detected that the trial packet is CRC-correct, the processing circuit 110 utilizes the trial packet as a recovered packet of the set of speech data.

For example, in a situation where the golden data of the plurality of packets (i.e. the correct version of the set of speech data) is equivalent to a binary value sequence {1111, 1111} and the erroneous data of a first erroneous packet and a second erroneous packet within the aforementioned at least two packets are equivalent to binary value sequences {1111, 1110} and {1111, 1101}, respectively, the processing circuit 110 finds two locations corresponding to two differences between the first erroneous packet and the second erroneous packet (e.g. the last two bits, since the last two bits "10" of {1111, 1110} and the last two bits "01" of {1111, 1101} are different from each other), and utilizes the two locations as the potential error bit locations of the set of speech data in this example. More particularly, the processing circuit 110 forcibly sets one of the plurality of candidate bits (e.g. the candidate bit "0", or the candidate bit "1") at the aforementioned at least one potential error bit location within one of the first erroneous packet and the second erroneous packet to obtain a trial packet and checks whether the trial packet is CRC-correct, in order to recover the set of speech data. For example, the processing circuit 110 may forcibly set the candidate bit "1" at the last bit of the erroneous data of the first erroneous packet (e.g. the last bit "0" of {1111, 1110}) to obtain a trial packet carrying trial data of {1111, 1111}, and then check whether this trial packet is CRC-correct. When it is detected that this trial packet carrying the trial data of {1111, 1111} is CRC-correct, the processing circuit 110 utilizes this trial packet as the recovered packet of the set of speech data. In another example, the processing circuit 110 may forcibly set the candidate bit "1" at the bit next to the last bit of the erroneous data of the second erroneous packet (e.g. the bit "0" of {1111, 1101}) to obtain a trial packet carrying trial data of {1111, 1111}, and then check whether this trial packet is CRC-correct. When it is detected that this trial packet carrying the trial data of {1111, 1111} is CRC-correct, the processing circuit 110 utilizes this trial packet as the recovered packet of the set of speech data. As a result, in a situation where the recovered packet of the set of speech data is obtained during the error correction mentioned in Step 320 (e.g. the CRC error correction mentioned above), the processing circuit 110 performs speech decoding on the recovered packet.

According to some embodiments of the present invention, such as some variations of the embodiment shown in FIG. 3, the processing circuit 110 may check whether each of the aforementioned at least two packets (e.g. the first erroneous packet and the second erroneous packet mentioned above) contains at least one CRC error to determine whether the aforementioned at least two packets are CRC-incorrect. When it is detected that each of the aforementioned at least two packets contains at least one CRC error, the processing circuit 110 performs the CRC error correction mentioned above.

In addition, the wireless communication control circuit 120 may wirelessly receive some other sets of speech data from the other electronic device, and treat some of the other sets of speech data differently, without performing the data correction mentioned in Step 320 (e.g. the CRC error correction mentioned above) on some of the other sets of speech data. For example, the wireless communication control circuit 120 may wirelessly receive some other packets (which are not the plurality of packets mentioned in Step 310) respectively corresponding to another set of speech data from the other electronic device, where the other set of speech data is transmitted from the other electronic device multiple times due to, for example, HEC or CRC errors. More particularly, when it is detected that the number of CRC-incorrect packets within the other packets is not greater than one, the processing circuit 110 performs packet loss concealment (PLC), rather than performing the CRC error correction on the other set of speech data. In another example, the wireless communication control circuit 120 may wirelessly receive at least one other packet (e.g. one or more other packets, which are not the plurality of packets mentioned in Step 310) corresponding to another set of speech data from the other electronic device, and may further check whether there is any HEC error or any CRC error in the aforementioned at least one other packet. More particularly, when it is detected that there is not any HEC error and there is not any CRC error in a specific packet of the aforementioned at least one other packet, the processing circuit 110 performs speech decoding on the specific packet, rather than performing the CRC error correction on the other set of speech data.

According to some embodiments of the present invention, such as some variations of the embodiment shown in FIG. 3, the error correction mentioned in Step 320, such as the aforementioned error correction operation (e.g. the CRC error correction mentioned above), can be selectively performed for at least one scenario of timing critical or re-transmission limited scenarios. For example, the error correction can be selectively performed for a timing critical scenario, in which the data processing time is limited (e.g. the data processing time should not be greater than a predetermined value). In another example, the error correction can be selectively performed for a re-transmission limited scenario, in which the number of data re-transmission of a specific set of speech data is limited (e.g. the number of data re-transmission of the specific set of speech data should not be greater than a predetermined value).

More particularly, according to a variation of the embodiment shown in FIG. 3, the processing circuit 110 may recover the set of speech data by trying possible combinations of suspected error bits on the payload of one of the plurality of packets, where the processing circuit 110 may forcibly set one of the plurality of candidate bits (e.g. the candidate bit "0", or the candidate bit "1") at any of the suspected error bits to try recovering the set of speech data mentioned in Step 310. This is for illustrative purposes only, and is not meant to be a limitation of the present invention. According to another variation of the embodiment shown in FIG. 3, in a situation where the set of speech data is transmitted from the other electronic device multiple times through BT transmission, the processing circuit 110 may recover the set of speech data according to a history buffer and Continuously Variable Slope Delta (CVSD) coefficients. For some details regarding the history buffer and the CVSD coefficients mentioned above, please refer to the BT standards.

According to another variation of the embodiment shown in FIG. 3, the processing circuit 110 may perform a bitwise majority vote operation on the payloads of the plurality of packets to obtain a majority vote result, and may further identify one or more possible error bits of the majority vote result, where a possible error bit of the majority vote result can be identified when the possible error bit is different from the corresponding bit of any of the payloads. More particularly, the processing circuit 110 may check whether the number of the aforementioned one or more possible error bits is less than a predetermined threshold. When it is detected that the number of the aforementioned one or more possible error bits is less than the predetermined threshold, the processing circuit 110 may perform the error correction by using the majority vote result. This is for illustrative purposes only, and is not meant to be a limitation of the present invention. In another example, when it is detected that the number of the aforementioned one or more possible error bits is less than the predetermined threshold, the processing circuit 110 may perform the error correction operation on the majority vote result.

According to another variation of the embodiment shown in FIG. 3, during the HEC of a specific packet of the plurality of packets, the processing circuit 110 may perform a bitwise majority vote operation on the header of this specific packet to obtain a majority vote result, and may further identify one or more possible error bits of the majority vote result to obtain the HEC error count of the header, where the HEC error count typically represents the number of the one or more possible error bits of the header. More particularly, the processing circuit 110 may check whether the HEC error count is less than a predetermined threshold. When it is detected that the HEC error count is less than the predetermined threshold, the processing circuit 110 may perform the error correction by using the majority vote result and by using the payload of this specific packet. This is for illustrative purposes only, and is not meant to be a limitation of the present invention. In another example, when it is detected that the HEC error count is less than the predetermined threshold, the processing circuit 110 may perform the error correction on the majority vote result.

In practice, the aforementioned at least one scenario may comprise the BT Synchronous Connection-Oriented (SCO), the BT Extended Synchronous Connection-Oriented (eSCO), or the BT Advanced Audio Distribution Profile (A2DP). More particularly, the aforementioned at least one scenario may comprise at least one (e.g. one or more) of the BT SCO, the BT eSCO, and the BT A2DP. This is for illustrative purposes only, and is not meant to be a limitation of the present invention. For example, the aforementioned at least one scenario may comprise one of some other scenarios that are different from any of the BT SCO, the BT eSCO, and the BT A2DP.

Figure 4:
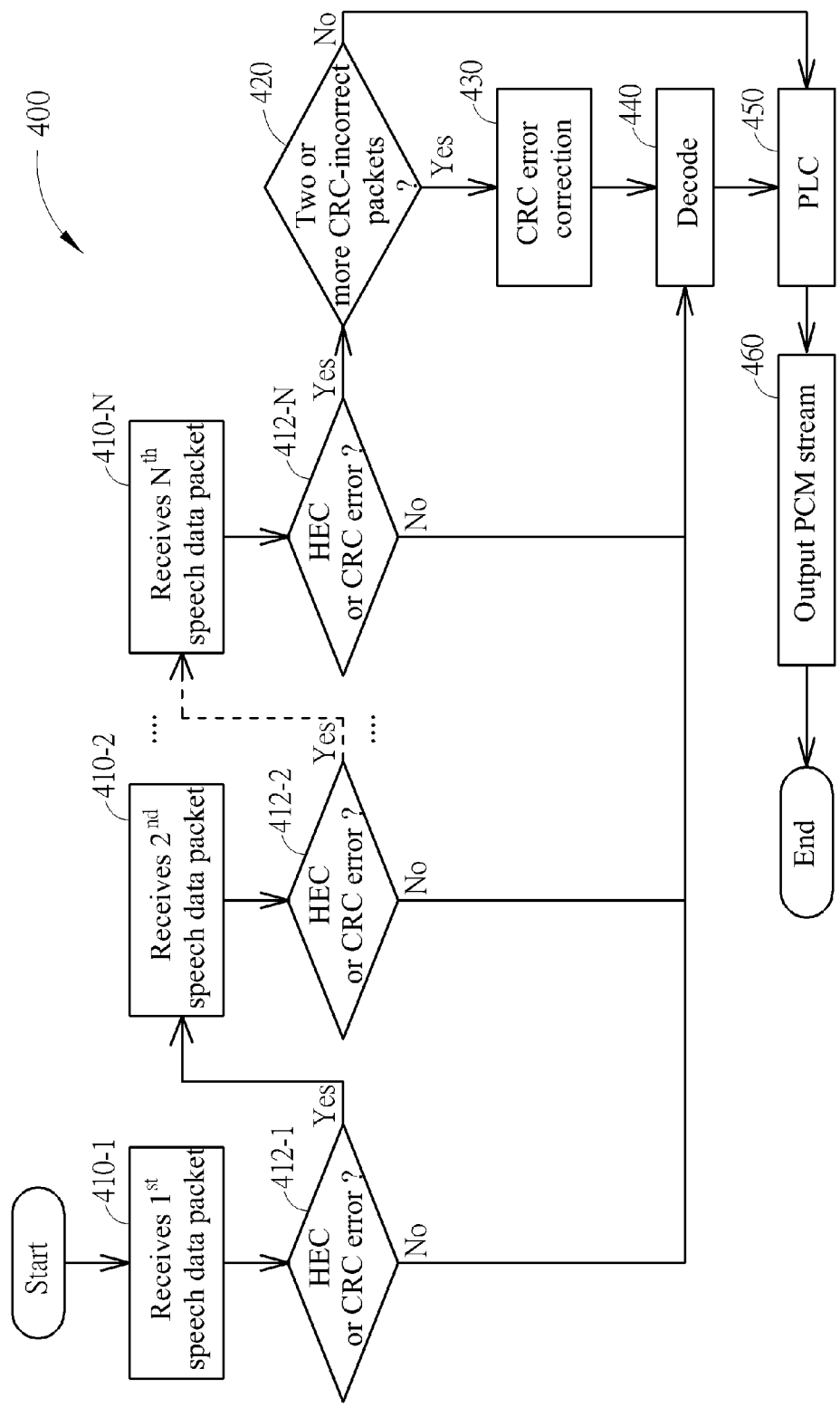
FIG. 4 illustrates a working flow involved with the method shown in FIG. 3 according to an embodiment of the present invention.

FIG. 4 illustrates a working flow 400 involved with the method 300 shown in FIG. 3 according to an embodiment of the present invention. For example, one or more speech data packets such as the $1^{st}$ speech data packet, the $2^{nd}$ speech data packet, ..., and the $N^{th}$ speech data packet shown in FIG. 4 may be wirelessly received, where the notation N may represent the maximum allowable value of the number of times that the speech data packets corresponding to the same set of data (e.g. the same set of speech data mentioned in Step 310) can be transmitted.

In Step 410-1, the processing circuit 110 wirelessly receives the $1^{st}$ speech data packet. Then, in Step 412-1, the processing circuit 110 checks whether there is any HEC error or any CRC error in the $1^{st}$ speech data packet. When it is detected that there is a HEC error or a CRC error in the $1^{st}$ speech data packet, Step 410-2 is entered; otherwise, Step 440 is entered.

In Step 410-2, the processing circuit 110 wirelessly receives the $2^{nd}$ speech data packet. Then, in Step 412-2, the processing circuit 110 checks whether there is any HEC error or any CRC error in the $2^{nd}$ speech data packet. When it is detected that there is a HEC error or a CRC error in the $2^{nd}$ speech data packet, Step 410-3 is entered; otherwise, Step 440 is entered. The rest may be deduced by analogy.

In a situation where the index n (which can be a positive integer in this embodiment) falls within the range of the interval [1, N−1], in Step 410-n, the processing circuit 110 wirelessly receives the $n^{th}$ speech data packet. Then, in Step 412-n, the processing circuit 110 checks whether there is any HEC error or any CRC error in the $n^{th}$ speech data packet. When it is detected that there is a HEC error or a CRC error in the $n^{th}$ speech data packet, Step 410-(n+1) is entered; otherwise, Step 440 is entered.

In Step 410-N, the processing circuit 110 wirelessly receives the $N^{th}$ speech data packet. Then, in Step 412-N, the processing circuit 110 checks whether there is any HEC error or any CRC error in the $N^{th}$ speech data packet. When it is detected that there is a HEC error or a CRC error in the $N^{th}$ speech data packet, Step 420 is entered; otherwise, Step 440 is entered.

In Step 420, the processing circuit 110 checks whether there are two or more CRC-incorrect packets within the $1^{st}$ speech data packet, the $2^{nd}$ speech data packet, . . . , and the $N^{th}$ speech data packet. When it is detected that there are two or more CRC-incorrect packets within the $1^{st}$ speech data packet, the $2^{nd}$ speech data packet, . . . , and the $N^{th}$ speech data packet, Step 430 is entered; otherwise, Step 450 is entered.

In Step 430, the processing circuit 110 performs the CRC error correction mentioned above. As a result, the recovered packet mentioned above can be obtained. Thus, in comparison with the related art, the present invention method and apparatus can enhance the correctness of speech data, and therefore, the overall performance of the electronic device implemented with the present invention method and apparatus is greater than that of the conventional electronic device.

Please note that the operations of Step 420 and Step 430 can be taken as an example of at least one portion (e.g. a portion or all) of the operation of Step 320. In addition, in a situation where Step 420 is entered, the $1^{st}$ speech data packet, the $2^{nd}$ speech data packet, . . . , and the $N^{th}$ speech data packet can be taken as an example of the plurality of packets mentioned in Step 310.

In Step 440, the processing circuit 110 (more particularly, an audio coder-decoder (CODEC) module of the processing circuit 110) decodes the correct data, which may come from Step 430 or any of Step 412-1, Step 412-2, . . . , and Step 412-N. For example, the correct data can be obtained from the recovered packet mentioned above. In another example, the correct data can be obtained from the $1^{st}$ speech data packet mentioned above. In another example, the correct data can be obtained from the $2^{nd}$ speech data packet mentioned above. In another example, the correct data can be obtained from the $n^{th}$ speech data packet mentioned above. In another example, the correct data can be obtained from the $N^{th}$ speech data packet mentioned above.

In Step 450, the processing circuit 110 performs the PLC mentioned above.

In Step 460, the processing circuit 110 outputs a pulse-code modulation (PCM) stream.

Please note that, for better comprehension, the operations of Step 410-1 through to Step 460 are illustrated as shown in FIG. 4. This is for illustrative purposes only, and is not meant to be a limitation of the present invention. According to some variations of this embodiment, at least one portion (e.g. a portion or all) of the operations of Step 410-1 through to Step 460 can be repeated. According to some variations of this embodiment, some portions of the operations of Step 410-1 through to Step 460 can be performed at the same time.

In practice, the maximum allowable value mentioned above can be determined in advance, and more particularly, can be determined during a design phase of the electronic device, in order to guarantee the overall performance of the electronic device, where the maximum allowable value is a predetermined value in this embodiment. As the number of times of the re-transmission of the same set of data (e.g. the same set of speech data mentioned in Step 310) is equal to the number of times that the speech data packets corresponding to the same set of data is transmitted minus one, the number of times of the re-transmission of the same set of data should be less than or equal to (N−1) in this embodiment, which means the number of times of the re-transmission of the same set of data is limited.

Based on the working flow 400 shown in FIG. 4, as the error correction can be selectively performed for the aforementioned at least one scenario of the timing critical or re-transmission limited scenarios (e.g. whether to perform the error correction of the set of speech data is determined according to the aforementioned at least one characteristic of the plurality of packets, such as that utilized in Step 420), the present invention method and apparatus can efficiently enhance the speech quality in a situation where the data processing time is limited. Therefore, no side effect is introduced in the electronic device implemented with the present invention method and apparatus.

Figure 5:
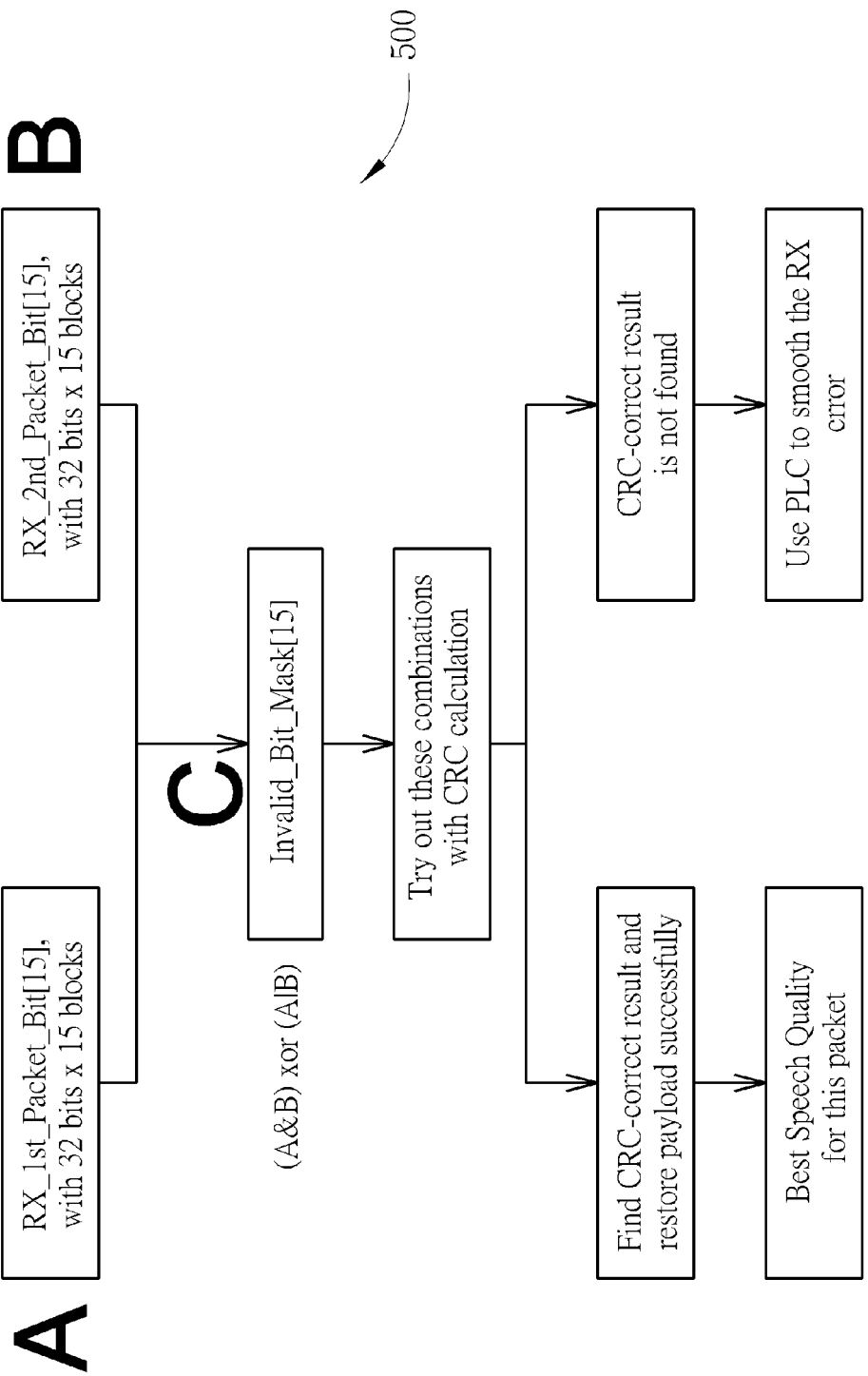
FIG. 5 illustrates a control scheme involved with the method shown in FIG. 3 according to an embodiment of the present invention.

FIG. 5 illustrates a control scheme 500 involved with the method 300 shown in FIG. 3 according to an embodiment of the present invention. For better comprehension, some notations such as A, B, and C can be utilized for representing the associated data of the control scheme 500, such as the original data in a wireless received packet (e.g. the original data A and B) and the temporary data obtained during calculation (e.g. the temporary data C). For example, each packet utilized in the control scheme 500 may comprise 15 blocks, each block of which may comprise 32 bits (labeled "32 bits×15 blocks" in FIG. 5).

According to this embodiment, the processing circuit 110 stores the original data A of the first packet RX1 in the array RX_1st_Packet_Bit[15], and stores the original data B of the second packet RX2 in the array RX_2nd_Packet_Bit[15]. Then, the processing circuit 110 calculates the temporary data C by performing the bitwise operations of "(A&B) xor (A|B)" and stores the temporary data C in the array Invalid_Bit_Mask[15], where the notations "&", "|", and "xor" represent the "AND", "OR", and "XOR" (Exclusive OR) operators, respectively. In addition, the processing circuit 110 may try out these combinations with CRC calculations, and more particularly, may recover the set of speech data by trying the possible combinations of the suspected error bits as disclosed above. For example, the processing circuit 110 finds the CRC-correct result and restores the payload successfully, where the best speech quality for this packet can be achieved. In another example, the CRC-correct result is not found, and therefore, the processing circuit 110 uses the PLC mentioned above to smooth the receiver (RX) error. Similar descriptions for this embodiment are not repeated in detail here.

According to some embodiments of the present invention, such as some variations of the embodiment shown in FIG. 3, the HEC error count may be obtained from the BT packet header with the FEC code. For example, a simple 3-times repetition FEC code (which can be referred to as "FEC ⅓", for brevity) may be used for the header. Regarding the implementation details of obtaining the HEC error count and using the FEC code, please refer to the BT standards for more information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing method applied to an electronic device, the method comprising the steps of:
   wirelessly receiving a plurality of packets corresponding to a same set of speech data from another electronic device; and
   selectively performing error correction operation on at least one of the plurality of packets to obtain the set of speech data, wherein whether to perform the error correction operation is determined according to at least one characteristic of the plurality of packets, wherein the error correction operation comprises Cyclic Redundancy Check (CRC) error correction, and the step of selectively performing the error correction operation on at least one of the plurality of packets to obtain the set of speech data further comprises:
  checking if at least two packets of the plurality of packets are CRC-incorrect, and
  if yes, performing the CRC error correction operation on at least one of the packets to obtain the set of speech data, wherein the step of performing the CRC error correction operation on at least one of the packets to obtain the set of speech data further comprises:
    modifying at least one potential error bit of at least one of the two packets to obtain a trial packet; and
    checking whether the trial packet is CRC-correct in order to obtain the set of speech data.

2. The data processing method of claim 1, the step of performing the CRC error correction operation on at least one of the packets to obtain the set of speech data further comprises:
  identifying the potential error bit according to at least one difference between the two packets.

3. The data processing method of claim 1, further comprising:
  if the trial packet is CRC-correct, the trial packet is utilized as the set of speech data for further speech decoding.

4. The data processing method of claim 1, wherein the step of checking if at least two packets of the plurality of packets are CRC-incorrect further comprises:
  checking whether each of the two packets contains at least one CRC error to determine whether the at least two packets are CRC-incorrect.

5. The data processing method of claim 1, wherein the step of selectively performing the error correction operation on at least one of the plurality of packets to obtain the set of speech data further comprises:
  checking if at least two packets of the plurality of packets are Header Error Check (HEC)-incorrect or Cyclic Redundancy Check (CRC)-incorrect, and
  if no, performing a packet loss concealment (PLC) operation, rather than performing the CRC error correction.

6. The data processing method of claim 1, further comprising:
  performing a speech decoding operation on the obtained speech data.

7. The data processing method of claim 1, further comprising:
  triggering re-transmission operation of the set of speech data in order to receive another packet of the plurality of packets.

8. The data processing method of claim 1, wherein the error correction operation is selectively performed for at least one scenario of timing critical or re-transmission limited scenarios.

9. The data processing method of claim 8, wherein the scenario comprises:
  Bluetooth (BT) Synchronous Connection-Oriented (SCO);
  BT Extended Synchronous Connection-Oriented (eSCO); or
  BT Advanced Audio Distribution Profile (A2DP).

10. The data processing method of claim 1, wherein the set of speech data is transmitted through Bluetooth (BT) transmission; and the step of selectively performing error correction operation on at least one of the plurality of packets to obtain the set of speech data further comprises:
  recovering the set of speech data according to a history buffer and Continuously Variable Slope Delta (CVSD) coefficients.

11. The data processing method of claim 1, wherein the step of selectively performing error correction operation on at least one of the plurality of packets to obtain the set of speech data further comprises:
  performing a bitwise majority vote operation on payloads of the plurality of packets to obtain a majority vote result and identifying possible error bits of the majority vote result, wherein a possible error bit of the majority vote result is identified when the possible error bit is different from a corresponding bit of any of the payloads;
  checking whether a number of the possible error bits is less than a predetermined threshold; and
  if yes, performing the error correction operation on the majority vote result.

12. The data processing method of claim 1, wherein the step of selectively performing error correction operation on at least one of the plurality of packets to obtain the set of speech data further comprises:
  during HEC of a specific packet of the plurality of packets, performing a bitwise majority vote operation on a header of the specific packet to obtain a majority vote result and identifying possible error bits of the majority vote result to obtain a HEC error count of the header, wherein the HEC error count represents a number of the possible error bits of the header;
  checking whether the HEC error count is less than a predetermined threshold; and
  if yes, performing the error correction operation on the majority vote result.

13. A data processing apparatus applying to an electronic device, the apparatus comprising:
  a wireless communication control circuit arranged to wirelessly receive a plurality of packets corresponding to a same set of speech data from another electronic device; and
  a processing circuit, coupled to the wireless communication control circuit, arranged to selectively perform error correction operation on at least one of the plurality of packets to obtain the set of speech data, wherein whether to perform the error correction operation of the set of speech data is determined according to at least one characteristic of the plurality of packets, wherein the error correction operation comprises Cyclic Redundancy Check (CRC) error correction, and the processing circuit selectively performs the error correction operation on at least one of the plurality of packets to obtain the set of speech data by:
    checking if at least two packets of the plurality of packets are CRC-incorrect, and
    if yes, performing the CRC error correction operation on at least one of the packets to obtain the set of speech data, wherein the processing circuit performs the CRC error correction operation on at least one of the packets to obtain the set of speech data by;
      modifying at least one potential error bit of at least one of the two packets to obtain a trial packet; and
      checking whether the trial packet is CRC-correct in order to obtain the set of speech data.

14. The data processing apparatus of claim 13, wherein the processing circuit further detects whether at least two packets of the plurality of packets are Cyclic Redundancy Check (CRC)-incorrect or Header Error Check (HEC)-incorrect.

15. The data processing apparatus of claim 14, wherein the processing circuit further identifies at least one potential error bit of at least one of the two packets according to at least one difference between the two packets, and modifies the potential error bit to obtain a trial packet, and checks whether the trial packet is CRC-correct in order to obtain the set of speech data.

* * * * *